US009183499B1

(12) United States Patent
Krivokon et al.

(10) Patent No.: US 9,183,499 B1
(45) Date of Patent: Nov. 10, 2015

(54) EVALUATING QUALITY BASED ON NEIGHBOR FEATURES

(71) Applicant: Google Inc., Mountain View, CA (US)

(72) Inventors: Igor Krivokon, Belmont, CA (US); Vladimir Ofitserov, Foster City, CA (US); Oleg Kislyuk, San Ramon, CA (US)

(73) Assignee: Google Inc., Mountain View, CA (US)

( * ) Notice: Subject to any disclaimer, the term of this patent is extended or adjusted under 35 U.S.C. 154(b) by 317 days.

(21) Appl. No.: 13/866,589

(22) Filed: Apr. 19, 2013

(51) Int. Cl.
*G06F 15/18* (2006.01)
*G06N 5/02* (2006.01)

(52) U.S. Cl.
CPC .......................................... *G06N 5/02* (2013.01)

(58) Field of Classification Search
None
See application file for complete search history.

(56) References Cited

U.S. PATENT DOCUMENTS

| | | | |
|---|---|---|---|
| 5,265,065 A | 11/1993 | Turtle | |
| 5,488,725 A | 1/1996 | Turtle | |
| 5,696,962 A | 12/1997 | Kupiec | |
| 5,920,854 A | 7/1999 | Kirsch et al. | |
| 5,963,940 A | 10/1999 | Liddy et al. | |
| 6,006,222 A | 12/1999 | Culliss | |
| 6,014,665 A | 1/2000 | Culliss | |
| 6,026,388 A | 2/2000 | Liddy et al. | |
| 6,067,565 A | 5/2000 | Horvitz | |
| 6,078,916 A | 6/2000 | Culliss | |
| 6,078,917 A | 6/2000 | Paulsen et al. | |
| 6,088,692 A | 7/2000 | Driscoll | |
| 6,134,532 A | 10/2000 | Lazarus et al. | |
| 6,182,068 B1 | 1/2001 | Culliss | |
| 6,185,559 B1 | 2/2001 | Brin et al. | |
| 6,249,252 B1 | 6/2001 | Dupray | |
| 6,285,999 B1 | 9/2001 | Page | |
| 6,321,228 B1 | 11/2001 | Crandall et al. | |
| 6,327,590 B1 | 12/2001 | Chidlovskii et al. | |

(Continued)

FOREIGN PATENT DOCUMENTS

WO WO 00/77689 12/2000
WO WO 01/16807 3/2001

(Continued)

OTHER PUBLICATIONS

Soumen Chakrabarti, et al. "Enhanced Topic Distillation using Text, Markup tags, and Hyperlinks". ACM 2001, pp. 208-216.

(Continued)

*Primary Examiner* — Jeffrey A Gaffin
*Assistant Examiner* — David H Kim
(74) *Attorney, Agent, or Firm* — Fish & Richardson P.C.

(57) ABSTRACT

Methods, systems, and apparatus for computing quality scores based on neighbor features. In one aspect, a method includes obtaining a quality model that was trained using a set of training entities; identifying a set of candidate entities that are different from each of the training entities; for each candidate entity: obtaining a first quality score for the candidate entity; obtaining one or more neighbor features for neighbor entities of the candidate entity, where each neighbor entity of the candidate entity is linked to the candidate entity; obtaining one or more entity specific feature values for the candidate entity, where each entity specific feature value is determined independent of the neighbor entities of the candidate entity; and determining a second quality score for the candidate entity using the quality model, the second quality score being computed based on the first quality score, the neighbor features, and the entity specific feature values.

20 Claims, 5 Drawing Sheets

(56) References Cited

U.S. PATENT DOCUMENTS

| | | |
|---|---|---|
| 6,341,283 B1 | 1/2002 | Yamakawa et al. |
| 6,353,849 B1 | 3/2002 | Linsk |
| 6,363,378 B1 | 3/2002 | Conklin et al. |
| 6,370,526 B1 | 4/2002 | Agrawal et al. |
| 6,480,843 B2 | 11/2002 | Li |
| 6,490,575 B1 | 12/2002 | Berstis |
| 6,526,440 B1 | 2/2003 | Bharat |
| 6,529,903 B2 | 3/2003 | Smith et al. |
| 6,539,377 B1 | 3/2003 | Culliss |
| 6,560,590 B1 | 5/2003 | Shwe et al. |
| 6,567,103 B1 | 5/2003 | Chaudhry |
| 6,587,848 B1 | 7/2003 | Aggarwal et al. |
| 6,601,075 B1 | 7/2003 | Huang et al. |
| 6,615,209 B1 | 9/2003 | Gomes |
| 6,623,529 B1 | 9/2003 | Lakritz |
| 6,658,423 B1 | 12/2003 | Pugh et al. |
| 6,671,681 B1 | 12/2003 | Emens et al. |
| 6,678,681 B1 | 1/2004 | Brin et al. |
| 6,725,259 B1 | 4/2004 | Bharat |
| 6,738,764 B2 | 5/2004 | Mao et al. |
| 6,754,873 B1 | 6/2004 | Law et al. |
| 6,792,416 B2 | 9/2004 | Soetarman et al. |
| 6,795,820 B2 | 9/2004 | Barnett |
| 6,816,850 B2 | 11/2004 | Culliss |
| 6,853,993 B2 | 2/2005 | Ortega et al. |
| 6,873,982 B1 | 3/2005 | Bates et al. |
| 6,877,002 B2 | 4/2005 | Prince |
| 6,882,999 B2 | 4/2005 | Cohen et al. |
| 6,901,402 B1 | 5/2005 | Corston-Oliver et al. |
| 6,912,505 B2 | 6/2005 | Linden et al. |
| 6,944,611 B2 | 9/2005 | Flank et al. |
| 6,944,612 B2 | 9/2005 | Roustant et al. |
| 6,954,750 B2 | 10/2005 | Bradford |
| 6,990,453 B2 | 1/2006 | Wang et al. |
| 7,016,939 B1 | 3/2006 | Rothwell et al. |
| 7,028,027 B1 | 4/2006 | Zha et al. |
| 7,072,886 B2 | 7/2006 | Salmenkaita et al. |
| 7,085,761 B2 | 8/2006 | Shibata |
| 7,113,939 B2 | 9/2006 | Chou et al. |
| 7,117,206 B1 | 10/2006 | Bharat et al. |
| 7,136,849 B2 | 11/2006 | Patrick |
| 7,146,361 B2 | 12/2006 | Broder et al. |
| 7,222,127 B1 | 5/2007 | Bem et al. |
| 7,231,399 B1 | 6/2007 | Bem et al. |
| 7,243,102 B1 | 7/2007 | Naam et al. |
| 7,266,765 B2 | 9/2007 | Golovchinsky et al. |
| 7,293,016 B1 | 11/2007 | Shakib et al. |
| 7,379,951 B2 | 5/2008 | Chkodrov et al. |
| 7,382,358 B2 | 6/2008 | Kushler et al. |
| 7,395,222 B1 | 7/2008 | Sotos |
| 7,426,507 B1 | 9/2008 | Patterson |
| 7,505,964 B2 | 3/2009 | Tong et al. |
| 7,516,146 B2 | 4/2009 | Robertson et al. |
| 7,533,092 B2 | 5/2009 | Berkhin et al. |
| 7,552,112 B2 | 6/2009 | Jhala et al. |
| 7,565,363 B2 | 7/2009 | Anwar |
| 7,565,367 B2 | 7/2009 | Barrett et al. |
| 7,566,363 B2 | 7/2009 | Starling et al. |
| 7,574,530 B2 | 8/2009 | Wang et al. |
| 7,584,181 B2 | 9/2009 | Zeng et al. |
| 7,610,282 B1 | 10/2009 | Datar et al. |
| 7,636,714 B1 | 12/2009 | Lamping et al. |
| 7,657,626 B1 | 2/2010 | Zwicky |
| 7,680,775 B2 | 3/2010 | Levin et al. |
| 7,693,818 B2 | 4/2010 | Majumder |
| 7,716,225 B1 | 5/2010 | Dean et al. |
| 7,747,612 B2 | 6/2010 | Thun et al. |
| 7,756,887 B1 | 7/2010 | Haveliwala |
| 7,783,632 B2 | 8/2010 | Richardson et al. |
| 7,801,885 B1 | 9/2010 | Verma |
| 7,809,716 B2 | 10/2010 | Wang et al. |
| 7,818,320 B2 | 10/2010 | Makeev |
| 7,836,058 B2 | 11/2010 | Chellapilla et al. |
| 7,844,589 B2 | 11/2010 | Wang et al. |
| 7,849,089 B2 | 12/2010 | Zhang et al. |
| 7,853,557 B2 | 12/2010 | Schneider et al. |
| 7,860,886 B2 | 12/2010 | Loftesness |
| 7,877,404 B2 | 1/2011 | Achan et al. |
| 7,895,177 B2 | 2/2011 | Wu |
| 7,925,498 B1 | 4/2011 | Baker et al. |
| 7,974,974 B2 | 7/2011 | Tankovich et al. |
| 7,987,185 B1 | 7/2011 | Mysen et al. |
| 8,001,136 B1 | 8/2011 | Papachristou et al. |
| 8,019,650 B2 | 9/2011 | Donsbach et al. |
| 8,024,326 B2 | 9/2011 | Tong et al. |
| 8,024,330 B1 | 9/2011 | Franco et al. |
| 8,037,042 B2 | 10/2011 | Anderson et al. |
| 8,037,043 B2 | 10/2011 | Zoeter et al. |
| 8,037,086 B1 | 10/2011 | Upstill et al. |
| 8,051,061 B2 | 11/2011 | Niu et al. |
| 8,060,497 B1 | 11/2011 | Zatsman et al. |
| 8,069,182 B2 | 11/2011 | Pieper |
| 8,073,263 B2 | 12/2011 | Hull et al. |
| 8,073,772 B2 | 12/2011 | Bishop et al. |
| 8,086,599 B1 | 12/2011 | Heymans |
| 8,086,690 B1 | 12/2011 | Heymans |
| 8,090,717 B1 | 1/2012 | Bharat |
| 8,156,111 B2 | 4/2012 | Jones et al. |
| 8,224,827 B2 | 7/2012 | Dean et al. |
| 8,255,412 B2 | 8/2012 | Gao et al. |
| 8,301,638 B2 | 10/2012 | Xu et al. |
| 8,346,763 B2 | 1/2013 | Chien et al. |
| 8,396,865 B1 | 3/2013 | Ie |
| 8,442,984 B1 | 5/2013 | Pennock |
| 8,447,760 B1 | 5/2013 | Tong |
| 8,498,974 B1 | 7/2013 | Kim |
| 8,521,725 B1 | 8/2013 | Pearson et al. |
| 8,615,514 B1 | 12/2013 | Fernandes |
| 8,661,012 B1 | 2/2014 | Baker |
| 8,661,029 B1 | 2/2014 | Kim |
| 8,694,374 B1 | 4/2014 | Diligenti |
| 8,694,511 B1 | 4/2014 | Corduneanu |
| 8,738,596 B1 | 5/2014 | Kim |
| 8,832,083 B1 | 9/2014 | Chen |
| 8,874,555 B1 | 10/2014 | Kim |
| 8,898,150 B1 | 11/2014 | Kuramochi |
| 8,898,153 B1 | 11/2014 | Kim |
| 8,909,655 B1 | 12/2014 | McDonnell |
| 8,924,379 B1 | 12/2014 | Kim |
| 8,938,463 B1 | 1/2015 | Kim |
| 8,959,093 B1 | 2/2015 | Nerurkar |
| 8,972,391 B1 | 3/2015 | McDonnell |
| 9,002,867 B1 | 4/2015 | Adams |
| 9,009,146 B1 | 4/2015 | Lopatenko |
| 9,092,510 B1 | 7/2015 | Stets |
| 9,110,975 B1 | 8/2015 | Diligenti et al. |
| 2001/0000356 A1 | 4/2001 | Woods |
| 2002/0034292 A1 | 3/2002 | Tuoriniemi et al. |
| 2002/0042791 A1 | 4/2002 | Smith et al. |
| 2002/0049752 A1 | 4/2002 | Bowman et al. |
| 2002/0103790 A1 | 8/2002 | Wang et al. |
| 2002/0123988 A1 | 9/2002 | Dean et al. |
| 2002/0133481 A1 | 9/2002 | Smith et al. |
| 2002/0165849 A1 | 11/2002 | Singh et al. |
| 2003/0009399 A1 | 1/2003 | Boerner |
| 2003/0018707 A1 | 1/2003 | Flocken |
| 2003/0028529 A1 | 2/2003 | Cheung et al. |
| 2003/0037074 A1 | 2/2003 | Dwork et al. |
| 2003/0078914 A1 | 4/2003 | Witbrock |
| 2003/0120654 A1 | 6/2003 | Edlund et al. |
| 2003/0135490 A1 | 7/2003 | Barrett et al. |
| 2003/0149704 A1 | 8/2003 | Yayoi et al. |
| 2003/0167252 A1 | 9/2003 | Odom et al. |
| 2003/0195877 A1 | 10/2003 | Ford et al. |
| 2003/0204495 A1 | 10/2003 | Lehnert |
| 2003/0220913 A1 | 11/2003 | Doganata et al. |
| 2003/0229640 A1 | 12/2003 | Carlson et al. |
| 2004/0006456 A1 | 1/2004 | Loofbourrow |
| 2004/0006740 A1 | 1/2004 | Krohn et al. |
| 2004/0034632 A1 | 2/2004 | Carmel et al. |
| 2004/0059708 A1 | 3/2004 | Dean at al. |
| 2004/0093325 A1 | 5/2004 | Banerjee et al. |
| 2004/0119740 A1 | 6/2004 | Chang et al. |
| 2004/0122811 A1 | 6/2004 | Page |

(56) References Cited

U.S. PATENT DOCUMENTS

| | | |
|---|---|---|
| 2004/0153472 A1 | 8/2004 | Rieffanaugh, Jr. |
| 2004/0158560 A1 | 8/2004 | Wen et al. |
| 2004/0186828 A1 | 9/2004 | Yadav |
| 2004/0186996 A1 | 9/2004 | Gibbs et al. |
| 2004/0199419 A1 | 10/2004 | Kim et al. |
| 2004/0215607 A1 | 10/2004 | Travis, Jr. |
| 2005/0015366 A1 | 1/2005 | Carrasco et al. |
| 2005/0027691 A1 | 2/2005 | Brin et al. |
| 2005/0033803 A1 | 2/2005 | Vleet et al. |
| 2005/0050014 A1 | 3/2005 | Gosse et al. |
| 2005/0055342 A1 | 3/2005 | Bharat et al. |
| 2005/0055345 A1 | 3/2005 | Ripley |
| 2005/0060290 A1 | 3/2005 | Herscovici et al. |
| 2005/0060310 A1 | 3/2005 | Tong et al. |
| 2005/0060311 A1 | 3/2005 | Tong et al. |
| 2005/0071741 A1 | 3/2005 | Acharya et al. |
| 2005/0102282 A1 | 5/2005 | Linden |
| 2005/0125376 A1 | 6/2005 | Curtis et al. |
| 2005/0160083 A1 | 7/2005 | Robinson |
| 2005/0192946 A1 | 9/2005 | Lu et al. |
| 2005/0198026 A1 | 9/2005 | Dehlinger et al. |
| 2005/0222987 A1 | 10/2005 | Vadon |
| 2005/0222998 A1 | 10/2005 | Driessen et al. |
| 2005/0240576 A1 | 10/2005 | Piscitello et al. |
| 2005/0240580 A1 | 10/2005 | Zamir et al. |
| 2005/0256848 A1 | 11/2005 | Alpert et al. |
| 2006/0047643 A1 | 3/2006 | Chaman |
| 2006/0069667 A1 | 3/2006 | Manasse et al. |
| 2006/0089926 A1 | 4/2006 | Knepper et al. |
| 2006/0095421 A1 | 5/2006 | Nagai et al. |
| 2006/0106793 A1 | 5/2006 | Liang |
| 2006/0173830 A1 | 8/2006 | Smyth et al. |
| 2006/0195443 A1 | 8/2006 | Franklin et al. |
| 2006/0200476 A1 | 9/2006 | Gottumukkala et al. |
| 2006/0200556 A1 | 9/2006 | Brave et al. |
| 2006/0230040 A1 | 10/2006 | Curtis et al. |
| 2007/0005575 A1 | 1/2007 | Dai et al. |
| 2007/0005588 A1 | 1/2007 | Zhang et al. |
| 2007/0038659 A1 | 2/2007 | Datar et al. |
| 2007/0061211 A1 | 3/2007 | Ramer et al. |
| 2007/0081197 A1 | 4/2007 | Omoigui |
| 2007/0106659 A1 | 5/2007 | Lu et al. |
| 2007/0112730 A1 | 5/2007 | Gulli et al. |
| 2007/0130370 A1 | 6/2007 | Akaezuwa |
| 2007/0156677 A1 | 7/2007 | Szabo |
| 2007/0192190 A1 | 8/2007 | Granville |
| 2007/0214131 A1 | 9/2007 | Cucerzan et al. |
| 2007/0233653 A1 | 10/2007 | Biggs et al. |
| 2007/0255689 A1 | 11/2007 | Sun et al. |
| 2007/0260597 A1 | 11/2007 | Cramer et al. |
| 2007/0266021 A1 | 11/2007 | Aravamudan et al. |
| 2007/0266439 A1 | 11/2007 | Kraft |
| 2007/0288450 A1 | 12/2007 | Datta et al. |
| 2008/0010143 A1 | 1/2008 | Kniaz et al. |
| 2008/0027913 A1 | 1/2008 | Chang et al. |
| 2008/0052219 A1 | 2/2008 | Sandholm et al. |
| 2008/0052273 A1 | 2/2008 | Pickens |
| 2008/0059453 A1 | 3/2008 | Laderman |
| 2008/0077570 A1 | 3/2008 | Tang et al. |
| 2008/0082518 A1 | 4/2008 | Loftesness |
| 2008/0091650 A1 | 4/2008 | Fontoura et al. |
| 2008/0114624 A1 | 5/2008 | Kitts |
| 2008/0114729 A1 | 5/2008 | Raman et al. |
| 2008/0114750 A1 | 5/2008 | Saxena et al. |
| 2008/0140699 A1 | 6/2008 | Jones et al. |
| 2008/0162475 A1 | 7/2008 | Meggs et al. |
| 2008/0183660 A1 | 7/2008 | Szulcewski |
| 2008/0189269 A1 | 8/2008 | Olsen |
| 2008/0208825 A1 | 8/2008 | Curtis et al. |
| 2008/0228442 A1 | 9/2008 | Lippincott et al. |
| 2008/0256050 A1 | 10/2008 | Zhang et al. |
| 2008/0313168 A1 | 12/2008 | Liu et al. |
| 2008/0313247 A1 | 12/2008 | Galvin |
| 2009/0012969 A1 | 1/2009 | Rail et al. |
| 2009/0055392 A1 | 2/2009 | Gupta et al. |
| 2009/0157643 A1 | 6/2009 | Gollapudi et al. |
| 2009/0182723 A1 | 7/2009 | Shnitko et al. |
| 2009/0287656 A1 | 11/2009 | Bennett |
| 2010/0106706 A1 | 4/2010 | Rorex et al. |
| 2010/0125570 A1* | 5/2010 | Chapelle et al. ............... 707/722 |
| 2010/0131563 A1 | 5/2010 | Yin |
| 2010/0169323 A1* | 7/2010 | Liu et al. ........................ 707/748 |
| 2010/0205541 A1 | 8/2010 | Rapaport et al. |
| 2010/0228738 A1 | 9/2010 | Mehta et al. |
| 2010/0241472 A1 | 11/2010 | Hernandez |
| 2011/0295844 A1 | 12/2011 | Sun et al. |
| 2011/0320387 A1* | 12/2011 | He et al. ........................... 706/12 |
| 2012/0191705 A1 | 7/2012 | Tong et al. |
| 2012/0254076 A1* | 10/2012 | Yang et al. ....................... 706/12 |
| 2013/0054603 A1* | 2/2013 | Birdwell et al. ............... 707/738 |

FOREIGN PATENT DOCUMENTS

| | | |
|---|---|---|
| WO | WO 01/67297 | 9/2001 |
| WO | WO 2004/059514 | 7/2004 |

OTHER PUBLICATIONS

Gabriel Somlo et al., "Using Web Hepler Agent Profiles in Query Generation", ACM, Jul. 2003, pp. 812-818.

Australian Examiner, Tim Yang, Australian Patent Office Non-Final Office Action in AU App. Ser. No. 2004275274, mailed Feb. 3, 2010, 2 pages.

Dan Olsen et al., "Query-by-critique: Spoken Language Access to Large Lists", ACM, Oct. 2002, pp. 131-140.

Susan Gauch et al., "A Corpus Analysis Approach for Automatic Query Expansion and its Extension to Multiple Databases", ACM, 1999, pp. 250-269.

Nicolas Bruno et al., "Top-K Selection Queries over Relational Databases: Mapping Strategies and Performance Evaluation", ACM, Jun. 2002, pp. 153-187.

Ji-Rong Wen et al., "Query Clustering using User Logs", ACM, Jan. 2002, pp. 59-81.

Brin, S. And L. Page, the Anatomy of a Large-Scale Hypertextual Web Search Engine, Computer Science Department, 1998.

European Examiner Marja Brouwers, International Search Report and Written Opinion for Application No. PCT/US2004/029615, dated Jan. 19, 2005, 8 pages.

Hungarian Patent Office, Examiner Judit Hajdu, International Search Report and Written Opinion for Application No. 200806756-3, dated Nov. 19, 2010 12 pages.

Authorized Officer Athina Nickitas-Etienne, International Preliminary Report and Written Opinion for Application No. PCT/US2004/029615, mailed Mar. 23, 2006.

Indian Examiner Prem Nath, Indian Office Action in Indian Application No. 686/KOLNP/2006, mailed Jun. 3, 2008, 2 pages.

Danish Examiner Henrik Ebbesen Jensen, Danish Search Report and Written Opinion for Application No. 200601630-7, dated Jun. 21, 2007, 15 pages.

Jansen et al., "An Analysis of Web Documents Retrieved and Viewed", School of Information Sciences and Technology, The Pennsylvania State University, the 4th International Conference on Internet Computing, Las Vegas, Nevada, pp. 65-69, Jun. 23-26, 2003, 5 pages.

Agichtein, et al; *Improving Web Search Ranking by Incorporating User Behavior Information*; Aug. 2006; Proceedings of the Twenty-Ninth Annual International ACM SIGIR Conference on Research and Development in Information Retrieval, pp. 19-26.

Agichtein, et al; *Learning User Interaction Models for Predicting Web Search Result Performances*; Aug. 2006; Proceedings of the Twenty-Ninth Annual International ACM SIGIR Conference on Research and Development in Information Retrieval, pp. 3-10.

Bar-Llan et al., "Presentation Bias is Significant in Determining User Preference for Search Results—A User Study"; Journal of the American Society for Information Science and Technology, vol. 60, Issue 1 (pp. 135-149), Sep. 2008, 15 pages.

Bar-Llan et al.; "Methods for comparing rankings of search engine results"; Computer Networks: The International Journal of Computer and Telecommunications Networking, Jul. 2006, vol. 50, Issue 10, 19 pages.

(56) References Cited

OTHER PUBLICATIONS

Boldi, et al.; *The Query-flow Graph: Model and Applications; CKIM '08*, Oct. 26-30, Napa Valley, California, USA, pp. 609-617.
Boyan et al.; *A Machine Learning Architecture for Optimizing Web Search Engines* ; Aug. 1996; Internet-based information systems-Workshop Technical Report-American Association for Artificial Intelligence, pp. 1-8.
Burke, Robin, Integrating Knowledge-based and Collaborative-filtering Recommender Systems, AAAI Technical Report WS-99-01. Compilation copyright © 1999, AAAI (www.aaai.org), pp. 69-72.
Craswell, et al.; *Random Walks on the Click Graph*; Jul. 2007; SIGIR '07, Amsterdam, The Netherlands, 8 pages.
Cutrell, et al.; *Eye tracking in MSN Search: Investigating snippet length, target position and task types*; 2007; Conference on Human Factors in Computing Systems—Proceedings of the SIGCHI Conference on Human Factors in Computing Systems.
Diligenti, et al., *Users, Queries and Documents: A Unified Representation for Web Mining*, wi-iat, vol. 1, 2009 IEEE/WIC/ACM International Joint Conference on Web Intelligence and Intelligent Agent Technology, 2009, pp. 238-244.
Hofmann, Thomas, *Latent Semantic Models for Collaborative Filtering*, ACM Transactions on Information Systems, vol. 22, No. 1, Jan. 2004, pp. 89-115.
Google News archive, Jul. 8, 2003, Webmasterworld.com, [online] Retrieved from the Internet http://www.webmasterwolrd.com/forum3/15085.htm [retrieved on Nov. 20, 2009] 3 pages.
Grčar, Miha, *User Profiling: Collaborative Filtering*, SIKDD 2004, Oct. 12-15, 2004, Ljubljana, Slovenia, 4 pages.
Joachims, T., Evaluating retrieval performance using clickthrough data. Proceedings of the SIGIR Workshop on Mathematical/Formal Methods in Information Retrieval; 2002, Aug. 12-15; Tampere, Finland, 18 pages.
Joachims et al., "Search Engines that Learn from Implicit Feedback"; Aug. 2007, IEEE Computer Society.
Joachims, "Evaluating Search Engines Using Clickthrough Data", Cornell University, Department of Computer Science, Draft, Feb. 19, 2002, 13 pages.
Kelly, et al.; *Implicit Feedback for Inferring User Preference: A Bibliography*; SIGIR Forum, vol. 37, No. 2 (2003), pp. 18-28.
Linden, Greg et al., *Amazon.com Recommendations: Item-to-Item Collaborative Filtering*, [online], http://computer.org/internet/, IEEE Internet Computing, Jan.-Feb. 2003, IEEE Computer Society, pp. 76-80.
Lu, Kuen S., Examiner, U.S. Appl. No. 11/556,143, filed Nov. 2, 2006, in Office Action mailed Jan. 25, 2010, 14 pages.
Lu, Kuen S., Examiner, U.S. Appl. No. 11/556,143, filed Nov. 2, 2006, in Office Action mailed Jul. 6, 2010, 20 pages.
Lu, Kuen S., Examiner, U.S. Appl. No. 11/556,143, filed Nov. 2, 2006, in Office Action mailed Apr. 20, 2011, 18 pages.
Nicole, Kristen, Heeii is StumbleUpon Plus Google Suggestions, [online], Retrieved from the Internet http://mashable.com/2007/05/15/heeii/, 11 pages.
Lemire, Daniel, *Scale and Translation Invariant Collaborative Filtering Systems*, Published in Information Retrieval, 8(1), pp. 129-150, 2005.
Mueller, Kurt A., Examiner, U.S. Appl. No. 11/685,095, filed Mar. 12, 2007, in Office Action mailed Feb. 8, 2010, 31 pages.
Mueller, Kurt A., Examiner, U.S. Appl. No. 11/685,095, filed Mar. 12, 2007, in Office Action mailed Feb. 25, 2009, 21 pages.
Mueller, Kurt A., Examiner, U.S. Appl. No. 11/685,095, filed Mar. 12, 2007, in Office Action mailed Sep. 10, 2009, 23 pages.
Mueller, Kurt A., Examiner, U.S. Appl. No. 11/685,095, filed Mar. 12, 2007, in Office Action mailed Apr. 13, 2011, 31 pages.
Radlinski, et al., *Query Chains: Learning to Rank from Implicit Feedback*, KDD '05, Aug. 21-24, 2005, Chicago, Illinois, USA, 10 pages.
Rahman, Sabana, Examiner, U.S. Appl. No. 11/556,086 filed Nov. 2, 2006, in Office Action mailed Jun. 23, 2010, 21 pages.
Schwab, et al., *Adaptivity through Unobstrusive Learning*, 2002, 16(3), pp. 5-9.
Stoilova, Lubomira et al., *GiveALink: Mining a Semantic Network of Bookmarks for Web Search and Recommendation*, LinkKDD '05, Aug. 21, 2005, Chicago, IL, USA, 8 pages.
W3C, URIs, URLs and URNs: Classification and Recommendations 1.0, Report from the joint W3C/IETF URI Planning Interest Group, Sep. 21, 2001, 8 pages.
Xiao, et al., *Measuring Similarity of Interests for Clustering Web-Users*, ADC, 2001, pp. 107-114.
Xie et al., *Web User Clustering from Access Log Using Belief Function*, K-CAP '01, Oct. 22-23, 2001, Victoria, British Columbia, Canada, pp. 202-208.
Yu et al., *Selecting Relevant Instances for Efficient and Accurate Collaborative Filtering*, CIKM '01, Nov. 5-10, 2001, Atlanta, Georgia, pp. 239-246.
Zeng et al., *Similarity Measure and Instance Selection for Collaborative Filtering*, WWW '03, May 20-24, 2003, Budapest, Hungary, pp. 652-658.
Zeng, et al., "Learning to Cluster Web Search Results", SIGIR '04, Proceedings of the 27th Annual International ACM SIGIR conference on research and development in information retrieval, 2004.
Jones et al., "Pictures of Relevance: A Geometric Analysis of Similarity Measures", Journal of the American Society for Information Science, Nov. 1987, 23 pages.
Kaplan et al., "Adaptive Hypertext Navigation Based on User Goals and Context", User Modeling and User-Adapted Interaction 2, 1993; pp. 193-220, 28 pages.
Liddy et al., "A Natural Language Text Retrieval System With Relevance Feedback", 16th National Online, 1995, 3 pages.

\* cited by examiner

EVALUATING QUALITY BASED ON NEIGHBOR FEATURES

BACKGROUND

This specification relates to data processing and resource quality evaluation.

The Internet enables access to a wide variety of resources, such as video or audio files, images, and web pages for particular subjects. A variety of search engines are available for identifying particular resources accessible over the Internet. For example, web pages that satisfy a user's informational need can be identified by a search process in which keywords or other data are processed to identify web pages relevant to a user's search query. Search engines provide users with search results, often specifying the location of a resource that may be of interest to a user.

Search results generated by a search engine are generally ranked and presented to a user in an ordered list of search results. The rankings may be based on how the search engine evaluates the quality of resources or websites that include multiple resources, and/or how the search engine evaluates the relevance of resources that are referenced by the search results for a particular query.

SUMMARY

In general, one innovative aspect of the subject matter described in this specification can be embodied in methods that include the actions of obtaining a first quality model that was trained using a first set of training entities; identifying a set of candidate entities, where each candidate entity is different from each of the training entities; for each candidate entity in the set of candidate entities: obtaining a first quality score for the candidate entity; obtaining one or more neighbor features for neighbor entities of the candidate entity, where each neighbor entity of the candidate entity is an entity that is linked to the candidate entity; obtaining one or more entity specific feature values for the candidate entity, where each entity specific feature value is determined independent of the neighbor entities of the candidate entity; and determining a second quality score for the candidate entity using the first quality model, the second quality score being computed based on the first quality score, the neighbor features, and the entity specific feature values. Other embodiments of this aspect include corresponding systems, apparatus, and computer programs, configured to perform the actions of the methods, encoded on computer storage devices.

These and other embodiments can each optionally include one or more of the following features. The method may further include training a second quality model based on training features associated with the training entities, where the training features for each training entity include: a given quality score for the training entity; at least one neighbor quality score for at least one neighbor entity of the training entity; and at least one entity specific feature value of the training entity; wherein at least one neighbor entity of at least one training entity is a candidate entity, and wherein the second quality model provides, as output, a quality score for an entity.

The first quality model may be trained based on training features associated with the training entities, and the training features for each training entity may include: a given quality score for the training entity; at least one neighbor quality score for at least one neighbor entity of the training entity; and at least one entity specific feature value of the training entity.

The method may further include identifying a link between a candidate entity and a neighbor entity, the link specifying that the neighbor entity includes a link that references the candidate entity. The method may further include identifying a link between a candidate entity and a neighbor entity, the link specifying that the neighbor entity and the candidate entity are each hosted by a single host data processing apparatus.

Obtaining one or more neighbor features for neighbor entities of the candidate entity may comprise obtaining an average neighbor quality score, the average neighbor quality score specifying an average of one or more quality scores that correspond to the one or more of the neighbor entities.

An entity may be a set of websites that share a common characteristic, and the common characteristic may be shared by each entity is different from each other common characteristic shared by each other entity. Each entity may be represented by a node in an irregular graph, and an entity may be linked to a candidate entity if the nodes representing the entity and the candidate entity share an edge in the irregular graph.

Entity specific feature values may comprise one or more of: a layout score that indicates a quality associated with a visual layout of the entity; a selection rate that indicates a rate at which the entity is selected when presented as a search result in response to a search query; and a selection duration that indicates an average time the entity is displayed on a user device when selected.

Particular embodiments of the subject matter described in this specification can be implemented so as to realize one or more of the following advantages. Quality scores for a particular entity (e.g., a web page, website, or group of websites) can be determined and/or adjusted based on neighbor features (e.g., features of one or more entities that are linked to the particular entity), resulting in a measure of quality that does not depend solely on the features of the particular entity. Using neighboring entities to both train and apply a quality score model enables the quality score model to provide a quality score that considers the features of neighboring entities. As the model is applied, quality will smear from entity to entity, enabling further adjustment of a quality model that is periodically retrained, which results in the quality of additional entities being considered when evaluating the quality of the particular entity. Using measures of quality for entities, such as web pages or websites, to select entities to reference in search results enables a search engine to provide search results that are more likely to satisfy users' informational need.

In addition, entity quality may be used by a search engine in determining which entities should be indexed, and how often. For example, a search engine may index an entity with a high quality score more often than it indexes and entity with a low quality score.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A quality management system facilitates the calculation and propagation of quality scores for entities. For example, quality scores may be calculated for websites based on features of the website and the quality scores of neighboring websites (or web pages). The systems and methods disclosed herein facilitate the calculation and propagation of quality scores for entities.

Quality scores may be calculated for a set of entities by applying a quality model to the entities in the set. For example, a set of candidate websites that have not been scored using the quality model are identified, and the first quality model is applied to each of the candidate websites to obtain a measure of quality for the websites. The quality model is a model that was trained using a set of training entities. For example, each training entity in the set may be a website with a given quality score calculated from user reviews of the website, and the training model may have been trained using the given quality scores, as well as certain website features and links between websites.

Applying the first quality model includes obtaining, for each candidate entity, a first quality score for the candidate entity. The first quality score may be a default score, such as 0.5 on a 0 to 1 scale, or it may be some other measure of quality previously applied to the candidate. For each candidate entity, one or more neighbor features are obtained for neighbor entities of the candidate entity. For example, websites that include hyperlinks to a candidate site may be neighbors of the candidate site, and a neighbor feature may be an average quality score for a sample of the neighbor websites. One or more entity specific feature values, which are determined independent of neighbor entities, are also obtained for each candidate entity. One example entity specific feature is a layout score that indicates the quality of a website's layout. Another example is a click-through rate for a website. Using the first model, and the first quality score, neighbor features, and entity specific feature values for each candidate entity, a second quality score is computed for each candidate entity.

The second quality scores for candidate entities can be used, for example, to rank entities during a search operation. They can also be used in training a second quality model. For example, a second quality model can be trained in the same or similar manner as the first quality model, except that second quality scores for candidate entities will be used to adjust the second quality model during training. As used herein, entity may refer to a website, web page, resource, or other data for which quality may be determined for use in a search operation.

Figure 1:
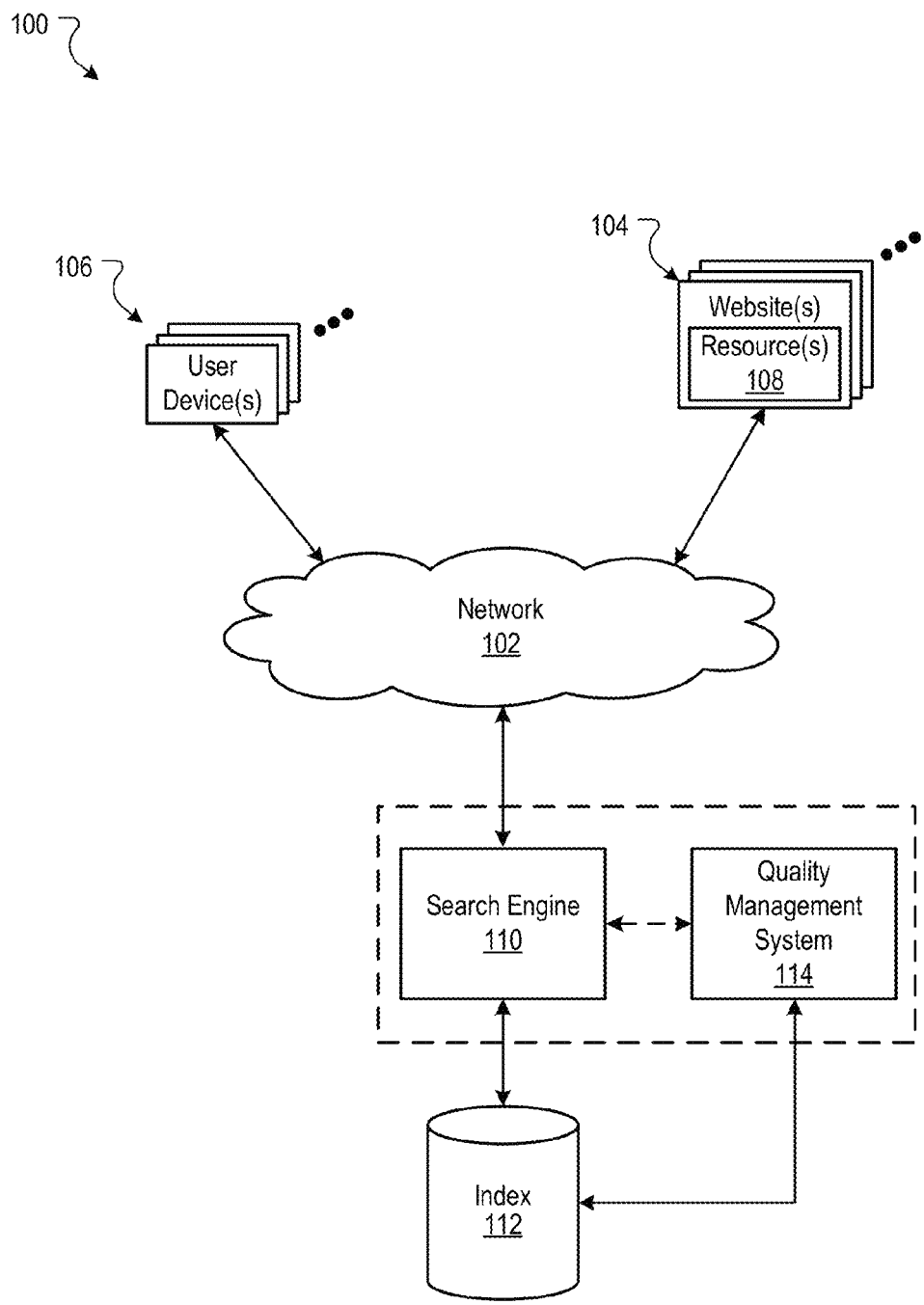
FIG. 1 is block diagram of an example environment in which quality scores are computed for entities based on neighbor features.

FIG. 1 is a block diagram of an example environment 100 in which quality scores are computed for entities based on neighbor features. A computer network 102, such as a local area network (LAN), wide area network (WAN), the Internet, or a combination thereof, connects publisher web sites 104, user devices 106, and a search engine 110. The search engine 110 is also connected to an index 112 and, optionally, a quality management system 114. In FIG. 1, the quality management system 114 is connected directly to the search engine 110, but the quality management system 114 can also be connected to the search engine through the network 102 and/or through one or more data processing apparatus.

A website 104 includes one or more resources 108 associated with a domain name and hosted by one or more servers. An example website is a collection of web pages formatted in hypertext markup language (HTML) that can contain text, images, multimedia content, and programming elements, such as scripts. Each website 108 is maintained by a content publisher, which is an entity that controls, manages and/or owns the website 104.

A resource 108 is data provided by a publisher over the network 102 and that is associated with a resource address. Resources include HTML pages, word processing documents, and portable document format (PDF) documents, images, video, and feed sources, to name just a few. The resources can include content, such as words, phrases, pictures, and so on, and may include embedded information (such as meta information and hyperlinks) and/or embedded instructions (such as scripts).

A user device 106 is an electronic device capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user to display and interact with text, images, videos, music and other information typically located on a web page at a website.

To facilitate searching of these resources 108, the search engine 110 identifies the resources by crawling the publisher web sites 104 and indexing the resources provided by the publisher web sites 104. The indexed and, optionally, cached copies of the resources, are stored in an index 112.

The user devices 106 submit search queries to the search engine 110. In response to the search request, the search engine 110 uses the index 112 to identify resources that are relevant to the queries. The search engine 110 identifies the resources in the form of search results and returns the search results to the user devices 106 in search results page resource. A search result is data generated by the search engine 110 that identifies a resource that satisfies a particular search query, and includes a resource locator for the resource. An example search result can include a web page title, a snippet of text extracted from the web page, and the URL of the web page.

The search results are ranked based on scores related to the resources identified by the search results, such as information retrieval ("IR") scores, quality scores for the website that hosts a resource, and/or a separate ranking of each resource relative to other resources (e.g., an authority score). The search results are ordered according to these scores and provided to the user device according to the order.

The user devices 106 receive the search results pages and render the pages for presentation to users. In response to the user selecting a search result at a user device 106, the user device 106 requests the resource identified by the resource locator included in the selected search result. The publisher of the web site 104 hosting the resource receives the request for the resource from the user device 106 and provides the resource to the requesting user device 106.

In some implementations, queries and other data submitted by user devices 106 and related selection data may be stored in one or more data stores, such as a selection database or a query log. The log(s) and/or database(s) generally include records of occurrences of search results that are presented and search results that are selected for each received search query. A selection of a search result can be, e.g., a user action made with respect to the search result that initiates a request for the resource identified by the search result. For example, the user action with respect to the search result may be a "click" on the search result using the cursor of an input device, a voice-based selection, or a selection by a user's finger on a presence-sensitive input mechanism, e.g., a touch-screen device, or any other appropriate selection mechanism. In some implementations, selection data may not be tethered to the identity of individual users. A selection log, for example, may be used to determine selection rates and selection duration values for websites or other entities. Query and selection data can thus be used by the search engine to determine the sequence of queries submitted by the user devices, the actions taken in response to the queries, and how often the queries are submitted.

As described in more detail below, the quality management system 114 facilitates the calculation and propagation of quality scores among entities, such as the websites 104. Quality scores may be used by the search engine 110 in connection with various search-related activities. For example, quality scores may be used to rank search results, such that search results that reference resources on low quality websites are demoted in rankings, while search results that reference resources on high quality websites are promoted in rankings. The search engine 110 may use quality scores to determine which websites should be indexed and how often websites should be crawled for updates, e.g., websites with high quality scores may be stored in the index 112 and crawled and updated more often than low quality websites, which may not be stored in the index 112 at all. The search engine 110 may also display quality scores with search results, providing the user with an explicit indication of the quality of the websites that host the search results. The calculation and propagation of quality scores for websites and other entities is described in further detail below.

In some implementations, the quality management system 114 determines the quality score for a particular entity based, at least in part, on features of other entities to which the particular entity is linked. The particular entity can be linked to another entity, for example, by sharing a same feature. For example, if two different web pages each contain the same code snippet, or the same image, these two web pages can be considered linked. The links between entities can be represented by an irregular graph in which each entity is represented as a node and each link is represented by an edge that corresponds to a feature that is shared by the entities.

Figure 2:
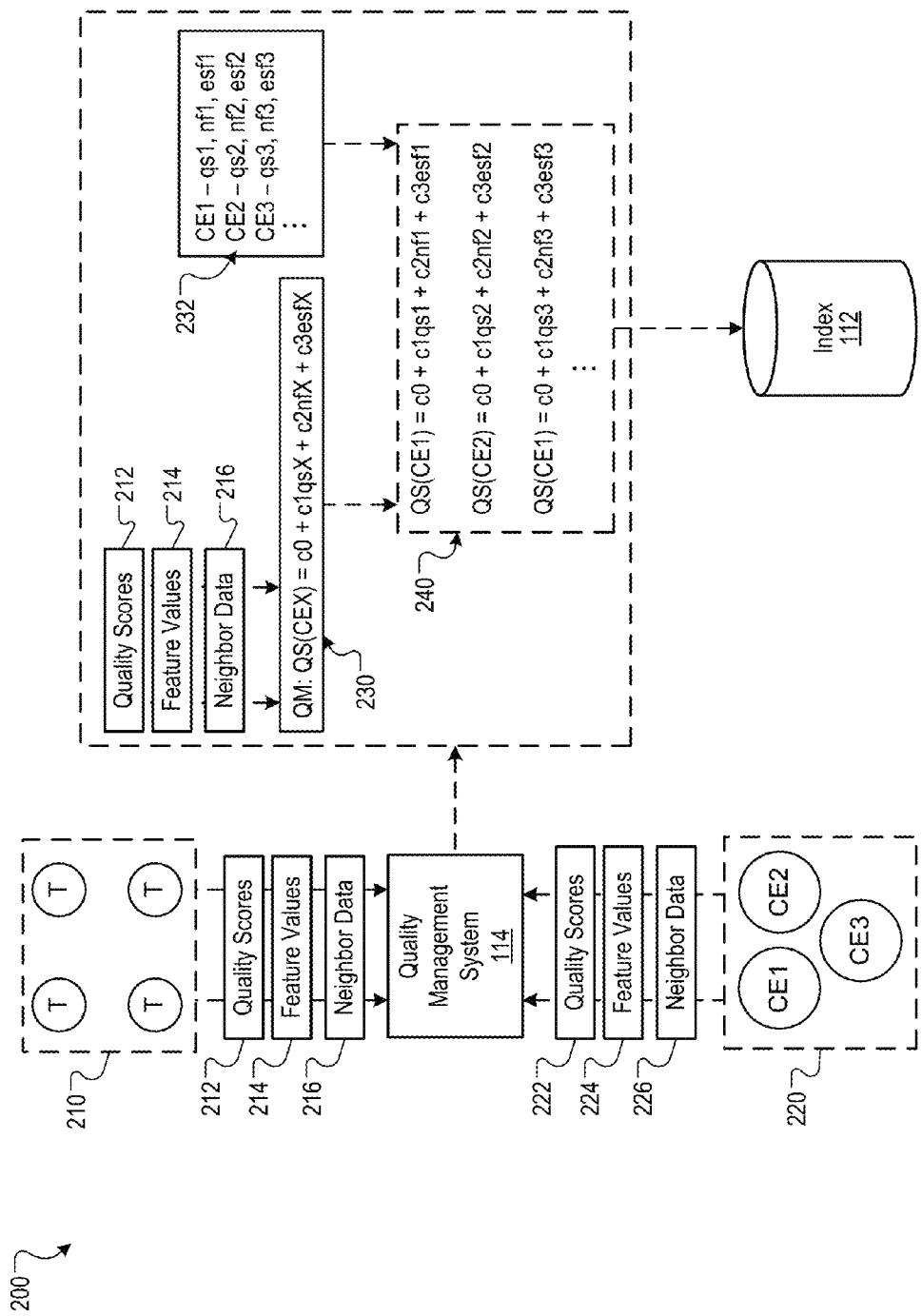
FIG. 2 is an illustration of an example process for computing quality scores for an entity based on neighbor features for neighbor entities.

FIG. 2 is an illustration of an example process 200 for computing quality scores for an entity based on neighbor features for neighbor entities. In the example process 200, the quality management system 114 obtains quality scores 212, entity specific feature values 214, and neighbor data 216 for a set of training entities 210. The training entities 210 are entities that have quality scores 212 that are used as target values for training a quality model, such as quality model 230, as described in more detail below. For example, websites that have many (e.g., at least a threshold number of) user reviews may be selected as training websites, because generally the higher the number of user reviews for a website, the more likely it is that the user reviews accurately reflect the population of users' perception of the corresponding website, which will result in a quality model that more accurately predicts user perception of a website.

Using the model 230, the quality management system 114 computes quality scores for candidate entities 220. Candidate entities are entities that are not included in the set of training entities 210, but for which quality scores 222, feature values 224, and neighbor data 226 may be obtained. Any method may be used to select candidate entities 220, and they need not be linked to any of the training entities 210. Training and application of the model is described in further detail below.

The first quality model 230 is a model that is trained on a first set of training entities 210. In some implementations, the first quality model 230 is trained by the quality management system 114. For example, each training entity in the first set of training entities 210 may have a given quality score, such as a score manually entered by a user and/or system administrator, or a score obtained from another source (e.g., obtained from a data store or computed based on user feedback). This given quality score indicates a measure of quality of an entity, and it may be used, for example, as a target value for training the first quality model. An example quality score may indicate a likelihood that a website is of high quality, and may be represented by a score on a scale from 0.0 to 1.0, where 0.0 indicates the lowest likelihood that a website is of high quality, and a 1.0 indicates the highest likelihood that the website is of high quality.

Each training entity also has at least one neighbor feature for at least one neighbor entity of the training entity. In some implementations, the neighbor data 216 includes data that specifies neighbors and/or neighbor features for each training entity. For example, neighbor data 216 may specify that a first training website has a hyperlink to a second training website, making the first training website a neighbor of the second. An example neighbor feature for the second training website may be a quality score of the first training website, such as the given quality score described above. In some implementations, other features and/or scores, or a combination thereof, may be neighbor features of a website, such as entity specific feature values—described in further detail below—of the neighbor websites.

Neighbor entities of a particular entity are entities that are linked to the particular entity. For example, hypertext links to and/or from one entity to another may define what a neighbor entity is. In the example above, neighbor websites of a training website were defined as websites that linked to the training website. Websites to which the training website is linked may also be neighbor websites. In some implementations, a link between entities may be based on a shared characteristic between entities. For example, entities that are hosted by the same host data processing apparatus may be neighbor entities. Entities that each include identical copies of data, such as a particular script, image, or document, may also be neighbor entities. In addition, entities that share a matching feature, such as a type of website or a semantic topic, may also be considered neighbor entities. Any characteristic, data, feature, or combination thereof may be used to identify links that define neighbor relationships between entities.

As described above, neighbor features for a candidate site may include quality scores of the entity's neighbors. In some implementations, a neighbor feature may be an average, median, or nth percentile neighbor quality score. For example, if a training website has three neighbor websites, a neighbor feature for the training website may be the average quality score of the three neighbors. In some situations, a sample of neighbor quality scores may be used to determine neighbor features of a training entity. For example, if a training website has 1,000 neighbor websites, a proper subset of those neighbor websites may be selected and used to determine an average or median neighbor quality score.

Each training entity further has at least one entity specific feature value. Entity specific feature values are independent of neighbor features. For example, a website may have a layout score that indicates a measure of quality of the website's graphical layout. Another example is a click-through rate for a website that indicates a rate at which a user selects search results that reference a resource hosted by the website when presented in response to a search query. A click-length, or selection duration, that indicates an average length of time users spend on a site, is another example entity specific feature value. Entity specific feature values may, in some implementations, be scaled—e.g., scaled values between 0.0 and 1.0. Any entity specific feature values, or a combination of entity specific feature values, may be used to train the first quality model.

The first quality model is trained using, for each training entity, the given quality score for the training entity, at least one neighbor feature for at least one neighbor entity of the training entity, and at least one entity specific feature value of the training entity. For purposes of training the first quality model, the neighbor feature(s) and entity specific feature value(s) are the variables, while the given quality score is the target parameter. Example training variables of the first quality training model include a median quality score of all neighbors, an average quality score of a sample of neighbor entities, a layout score for a training entity, a click-length value for a training entity, and a first quality score for the training entity—e.g. a measure of quality that was not calculated using the first training model, such as a given quality score.

Various training methods may be used to train the first quality model. For example, an iterative process may be used to train coefficients for the first quality model. Iterative procedures, such as Gibbs sampling or mean field procedures, may be used to calculate quality scores or feature values using the first quality model. In some implementations, the quality scores, neighbor features, and entity specific feature values are normalized. For example, a click length that indicates an average length of time a user visits a particular website may be normalized or scaled to a value between 0 and 1. The first quality model 230 in the example process 200 is represented by the following equation:

$$QS(CEX) = c0 + c1 qsX + c2 nfX + c3 esfX \quad (1)$$

Where CEX is a candidate entity, such as CE1 or CE2.

Coefficients c0, c1, c2, and c3 are values trained using the first set of training entities.

qsX is a quality score for the candidate entity, CEX.

nfX is a neighbor feature for the candidate entity, CEX.

esfX is an entity specific feature value for the candidate entity, CEX.

The foregoing formula (1) is an example first quality model. A first quality training model may include any number and type of coefficients for the various variables.

Quality scores 240 for candidate entities 220 are computed by the quality management system 114 using the first quality model 230 and candidate entity variables 232. Each candidate entity can be different from each of the training entities. In some situations, some candidate entities are neighbors of training entities. In other situations, no candidate entities are neighbors of training entities.

For each candidate entity 220, a quality score 222 for the candidate entity is obtained. In some implementations, the quality score is a default quality score. For example, the quality score variable "qs1" for the candidate entity "CE1" may be 0.5 on a scale of 0.0 to 1.0, where 0.0 indicates a site is of the lowest possible quality, and 1.0 indicates that the site is of the highest possible quality. In some implementations, the quality scores 222 are obtained the index 112.

For each candidate entity 220, at least one neighbor feature for neighbor entities is obtained. In the example process 200, neighbor data 226 includes a single neighbor feature for each candidate entity. For example, the neighbor feature variable "nf1" for the candidate entity "CE1" may be an average quality score for a sample of the neighbor entities of CE1. In some implementations, if the first quality model has not yet been applied to any of CE1's neighbors, the average quality score may be an average of the default quality scores for the neighbors, e.g., 0.5. As the quality scores of entities are updated using the first quality model, these updated quality scores may take the place of the default quality scores.

For each candidate entity 220, at least one entity specific feature value 224 is obtained. In the example process 200, a single entity specific feature value is obtained for each candidate entity. For example, the entity specific feature value variable "esf1" for the candidate entity "CE1" may be a click-length value that specifies an average click-length for the candidate entity.

Using the first quality model 230, the quality management system 114 computes second quality scores 240 for the candidate entities 220. In the example data flow, the second quality score for candidate entity "CE1" is "c0+c1qs1+c2nf1+c3esf1." The second quality score may replace, or be used to adjust, the original quality score for the entity. For example, if a candidate entity had a default quality score of 0.5 and a second quality score of 0.75, the default quality score could be replaced with the second quality score. As the quality management system 114 computes second quality scores 240 for candidate entities, those second quality scores may be used instead of the given quality scores when other second quality scores are being computed. For example, if CE1 is the only neighbor of CE2, CE1's second quality score may be CE2's neighbor feature variable, "nf2." Using the example values above, nf2 may be 0.75 (CE1's second quality score) as opposed to 0.5 (CE1's default quality score). Once second quality scores 240 are computed, the quality management system 114 may store them, for example, in the index 112.

In some implementations, a second quality model may be trained after second quality scores have been computed for candidate entities. The second quality model may be trained in a similar manner to the training of the first quality model. However, the second quality model may benefit from the second quality scores.

In some implementations, the second quality model may be trained using the first set of training entities. If the second quality model is trained using the same training entities and same training process, changes to the second quality model from the first may be due to changes in entity specific feature values, if any, and changes in neighbor feature values, such as neighbor quality scores. For example, if neighbor entities of a particular training entity have been given second quality scores based on the first quality model, that particular training entity may have a different neighbor feature value, which may cause an adjustment to the training model.

In some implementations, the quality management system may select a second set of training entities that includes entities from the first set of training entities and entities from the set of candidate entities. The second quality model may be trained using this second set of training entities. For example, the second quality scores of the training entities in the second set may be used as a target value for training the second quality model. In addition, the second quality scores may be used in determining neighbor feature values when a neighbor entity has a second quality score.

Various model training techniques may be used to train the second quality model. Any combination of training entities of the first set of training entities and candidate entities may be used to generate the second quality model. In some implementations, new entities that were neither training entities nor candidate entities may be added to the second training set. For example, a new website with a given quality score and entity specific feature values may be used in a second set of training entities.

Quality models may be iteratively trained. For example, each training iteration may be performed in a manner similar to the training described above. Each time a quality model is updated, or a new quality model is trained, the new quality model may be used to compute new scores for entities. The new scores for entities may affect future retraining of the quality model. In some implementations, one quality model is used and iteratively updated. In another implementation, multiple quality models may be trained and iteratively updated.

Figure 3:
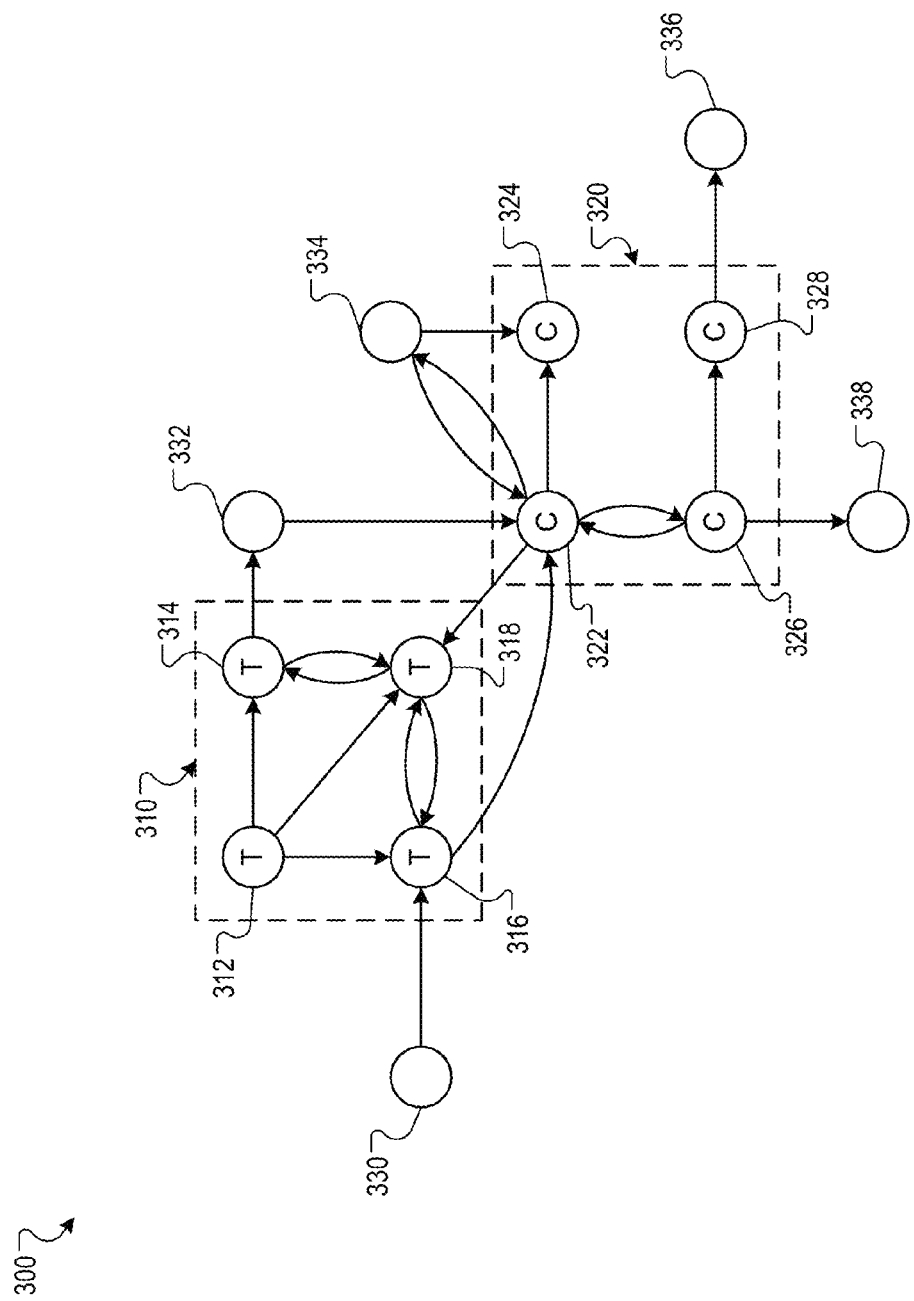
FIG. 3 is an illustration of an example graph of entities in which quality scores are computed for entities based on neighbor features.

FIG. 3 is an illustration of an example graph 300 of entities in which quality scores are computed for entities based on neighbor features. In some implementations, each entity is represented by a node in an irregular graph. For example, the example graph 300 may be a graph of websites, where each node in the irregular graph 300 represents a distinct website. A first set of training websites 310 is represented by nodes enclosed in a dashed-line box, and includes nodes 312, 314, 316, and 318. A set of candidate websites 320 is represented by nodes enclosed in another dashed-line box, and includes nodes 322, 324, 326, and 328.

Links between entities are represented in the graph 300 as edges. In some implementations, the graph is a directed graph, and directions on edges indicate one-way links, or one-way neighbor relationships. For example, the edge between 312 and 314 indicates that 312 is a neighbor of 314. If, for example, neighbors are defined by websites that include hyperlinks to one another, this indicates that website 312 includes a hyperlink to website 314. Because there is no link from 314 to 312, website 314 is not a neighbor of 312. In some implementations, the graph is not directed, and entities are linked to one another if they share an edge. For example, if links are defined by entities that share a common host data processing apparatus, a graph depicting linked nodes would not need to include directed edges.

In some implementations, the first quality model is trained by iteratively traversing the nodes representing training entities in the graph. The graph may also be used to apply the first quality model to candidate entities. When traversing the directed graph, the directed edges do not need to restrict the path of traversal. For example, after the first quality model is applied to website 324, the quality management system may proceed to website 322, even though no edge exists from 324 to 322.

The graph representation of entities facilitates the computation of quality scores for entities. For example, given a first quality model trained on the first training set 310 of websites, computation of second quality scores for the candidate set 320 of websites may proceed as follows. For candidate website 322, a first quality score is obtained. For example, a default quality score of 0.5 may be used. An average quality score of 322's neighbor websites is obtained. Assuming a neighbor is defined as a website that links to a candidate site, the neighbors of 322 are 316, 326, 332, and 334. In this example, neighbor 326 will have the default quality score –0.5. Neighbor 318 is a training website, and it likely has a quality score that is different from the default, but that need not be the case. One website specific feature value for website 322 is obtained next, such as a layout score that indicates a measure of quality associated with the website's visual layout.

The first quality score, average neighbor score, and layout score may then be normalized (if applicable) and used as input variables for the first quality model. Based on those input variables, the first quality model outputs a second quality score for website 322. This second quality score replace the default 0.5 quality score. In this example, assume that the second quality score for website 322 is 0.75 which, on a scale of 0 to 1.0, indicates an improvement over the default quality score of 0.5.

The example graph may be traversed in any order, and in this example, website 324 may be the next website for which a second quality score is computed. The second quality score is computed in the same way described above for website 322. However, website 322 is a neighbor of website 324. Accordingly, when determining the average quality score of 324's neighbors, the second quality score (e.g., 0.75) for 322 is used, as opposed to the default quality score (e.g., 0.5). Depending on the coefficients used in the first quality model, a higher average neighbor quality score increases the likelihood that website 324 will be of higher quality.

Other forms of data representation may be used in computing quality scores for entities. For example, an undirected graph, matrix, or posting list may be used to store and manipulate data for entities.

Figure 4:
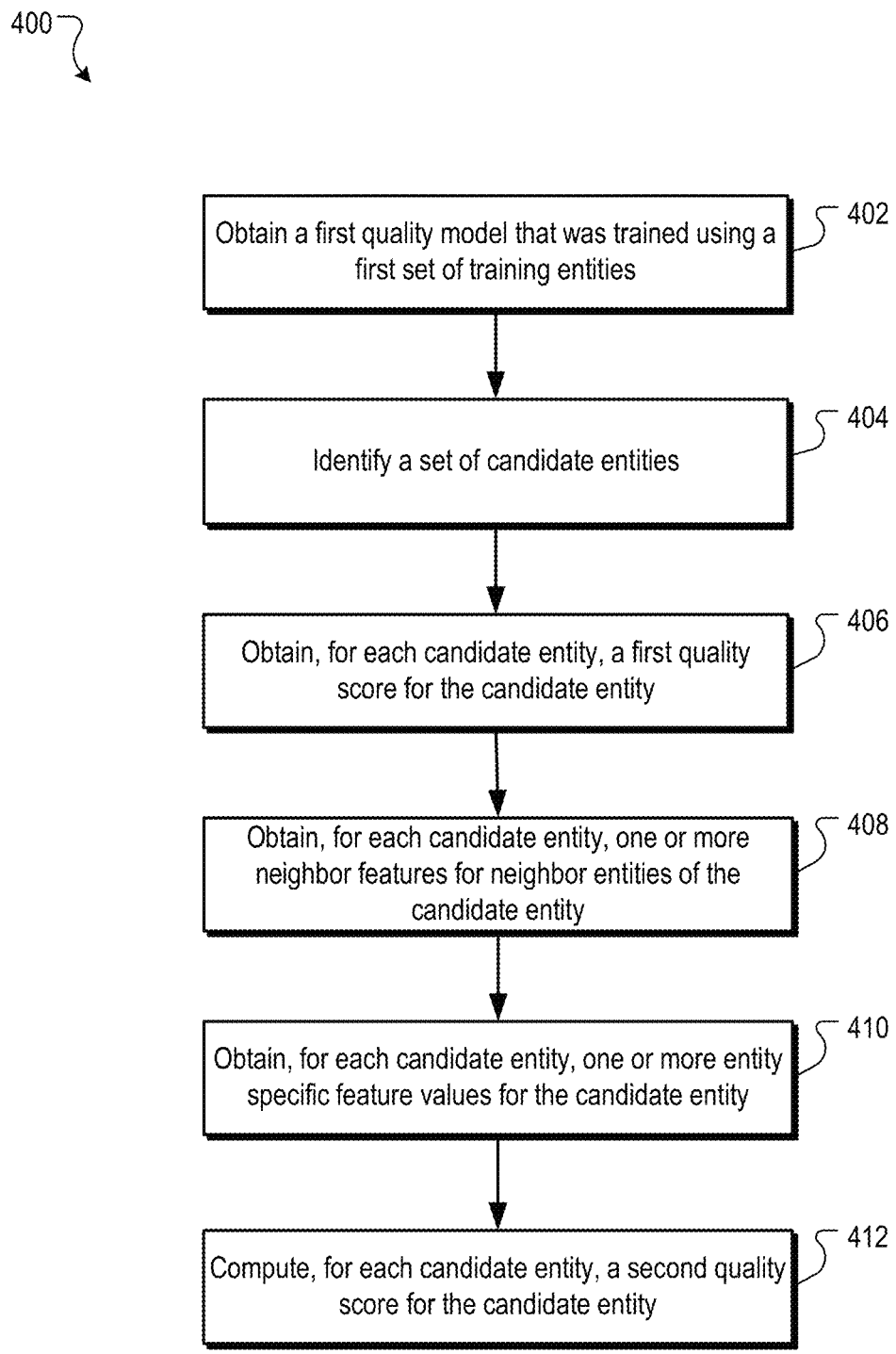
FIG. 4 is a flow diagram of an example process in which quality scores are computed for entities based on neighbor features.

FIG. 4 is a flow diagram of an example process 400 in which quality scores are computed for entities based on neighbor features. The process 400 may be used by a data processing apparatus, such as a quality management system.

A first quality model is obtained (402). In some implementations, the first quality model is a model trained using a first set of training entities. For example, as described above, the first quality model can be trained based on given quality scores, neighbor features, and entity specific feature values for a set of training entities. The trained first quality model may receive as input, for example, i) a quality score for a particular website, ii) an average quality score of outbound neighbor websites—e.g., websites to which the particular website links, iii) an average quality score of inbound neighbor websites—e.g., websites that link to the particular website, and iv) an average click duration for the particular website. The output of the first quality model can be, for example, a quality score for the particular website.

A set of candidate entities is identified (404). In some implementations. each candidate entity, or at least one of the candidate entities, is different from each of the training entities. For example, a group of 100 websites, that are each different from a set of training websites, may be identified as candidate sites.

For each candidate entity, a first quality score for the candidate entity is obtained (406). For example, a default quality score, or previously calculated quality score, may be obtained for a candidate entity.

For each candidate entity, one or more neighbor features are obtained for neighbor entities of the candidate entity (408). In some implementations, each neighbor entity of the candidate entity is an entity that is linked to the candidate entity. The obtained neighbor features can be, for example, an average quality score of outbound neighbor websites may be one neighbor feature, and an average quality score of inbound neighbor websites may be another.

For each candidate entity, one or more entity specific feature values are obtained for the candidate entity (410). In some implementations, each entity specific feature value is independent of the neighbor entities of the candidate entity.

An average click duration for the particular website is an example entity specific feature value that is independent of neighboring websites.

For each candidate entity, a second quality score is computed for the candidate entity (412). The second quality score is computed using the first quality model, and the computation is based on the first quality score, the neighbor features, and the entity specific feature values. For example, the quality score, average quality score of outbound neighbors, average quality score of inbound neighbors, and average click duration may be provided, as input, to the first quality model, which outputs a second quality score for the candidate entity.

Figure 5:
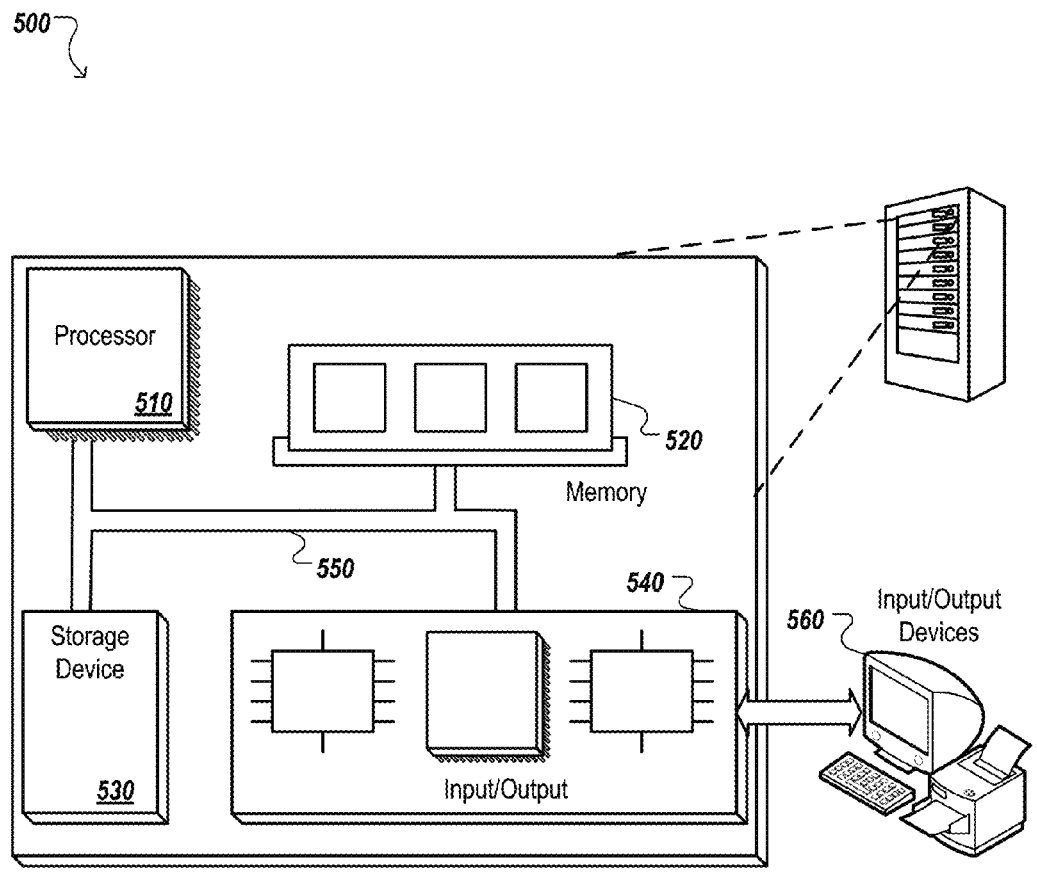
FIG. 5 is a block diagram of an example data processing apparatus.

FIG. 5 is a block diagram of an example data processing apparatus 500. The system 500 includes a processor 510, a memory 520, a storage device 530, and an input/output device 540. Each of the components 510, 520, 530, and 540 can, for example, be interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can, for example, include a hard disk device, an optical disk device, or some other large capacity storage device.

The input/output device 540 provides input/output operations for the system 500. In one implementation, the input/output device 540 can include one or more network interface devices, e.g., an Ethernet card, a serial communication device, e.g., an RS-232 port, and/or a wireless interface device, e.g., an 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   obtaining a first quality model that was trained using a first set of training entities;
   identifying a set of candidate entities, where each candidate entity is different from each of the training entities;
   for each candidate entity in the set of candidate entities:
   obtaining a first quality score for the candidate entity;
   obtaining one or more neighbor features for neighbor entities of the candidate entity, where each neighbor entity of the candidate entity is an entity that is linked to the candidate entity;
   obtaining one or more entity specific feature values for the candidate entity, where each entity specific feature value is determined independent of the neighbor entities of the candidate entity; and
   determining a second quality score for the candidate entity using the first quality model, the second quality score being computed based on the first quality score, the neighbor features, and the entity specific feature values.

2. The method of claim 1, further comprising:
   training a second quality model based on training features associated with the training entities, where the training features for each training entity include:
   a given quality score for the training entity;
   at least one neighbor quality score for at least one neighbor entity of the training entity; and
   at least one entity specific feature value of the training entity;
   wherein at least one neighbor entity of at least one training entity is a candidate entity, and wherein the second quality model provides, as output, a quality score for an entity.

3. The method of claim 1, wherein the first quality model was trained based on training features associated with the training entities, where the training features for each training entity include:
   a given quality score for the training entity;
   at least one neighbor quality score for at least one neighbor entity of the training entity; and
   at least one entity specific feature value of the training entity.

4. The method of claim 1, further comprising:
identifying a link between a candidate entity and a neighbor entity, the link specifying that the neighbor entity includes a link that references the candidate entity.

5. The method of claim 1, further comprising:
identifying a link between a candidate entity and a neighbor entity, the link specifying that the neighbor entity and the candidate entity are each hosted by a single host data processing apparatus.

6. The method of claim 1, wherein obtaining one or more neighbor features for neighbor entities of the candidate entity comprises obtaining an average neighbor quality score, the average neighbor quality score specifying an average of one or more quality scores that correspond to the one or more of the neighbor entities.

7. The method of claim 1, wherein entity specific feature values comprise one or more of:
a layout score that indicates a quality associated with a visual layout of the entity;
a selection rate that indicates a rate at which the entity is selected when presented as a search result in response to a search query; and
a selection duration that indicates an average time the entity is displayed on a user device when selected.

8. The method of claim 1, wherein an entity is a set of websites that share a common characteristic, and wherein the common characteristic shared by each entity is different from each other common characteristic shared by each other entity.

9. The method of claim 1, wherein each entity is represented by a node in an irregular graph, and wherein an entity is linked to a candidate entity if the nodes representing the entity and the candidate entity share an edge in the irregular graph.

10. A system comprising:
a data processing apparatus; and
a data store storing instructions that, when executed by the data processing apparatus, cause the data processing apparatus to perform operations comprising:
obtaining a first quality model that was trained using a first set of training entities;
identifying a set of candidate entities, where each candidate entity is different from each of the training entities;
for each candidate entity in the set of candidate entities:
obtaining a first quality score for the candidate entity;
obtaining one or more neighbor features for neighbor entities of the candidate entity, where each neighbor entity of the candidate entity is an entity that is linked to the candidate entity;
obtaining one or more entity specific feature values for the candidate entity, where each entity specific feature value is determined independent of the neighbor entities of the candidate entity; and
determining a second quality score for the candidate entity using the first quality model, the second quality score being computed based on the first quality score, the neighbor features, and the entity specific feature values.

11. The system of claim 10, wherein the operations further comprise:
training a second quality model based on training features associated with the training entities, where the training features for each training entity include:
a given quality score for the training entity;
at least one neighbor quality score for at least one neighbor entity of the training entity; and
at least one entity specific feature value of the training entity;
wherein at least one neighbor entity of at least one training entity is a candidate entity, and wherein the second quality model provides, as output, a quality score for an entity.

12. The system of claim 10, wherein the first quality model was trained based on training features associated with the training entities, where the training features for each training entity include:
a given quality score for the training entity;
at least one neighbor quality score for at least one neighbor entity of the training entity; and
at least one entity specific feature value of the training entity.

13. The system of claim 10, wherein the operations further comprise:
identifying a link between a candidate entity and a neighbor entity, the link specifying that the neighbor entity includes a link that references the candidate entity.

14. The system of claim 10, wherein the operations further comprise:
identifying a link between a candidate entity and a neighbor entity, the link specifying that the neighbor entity and the candidate entity are each hosted by a single host data processing apparatus.

15. The system of claim 10, wherein obtaining one or more neighbor features for neighbor entities of the candidate entity comprises obtaining an average neighbor quality score, the average neighbor quality score specifying an average of one or more quality scores that correspond to the one or more of the neighbor entities.

16. A system comprising:
a data processing apparatus; and
a data store storing instructions that, when executed by the data processing apparatus, cause the data processing apparatus to perform operations comprising:
obtaining a first quality model that was trained using a first set of training entities;
identifying a set of candidate entities, where each candidate entity is different from each of the training entities;
for each candidate entity in the set of candidate entities:
obtaining a first quality score for the candidate entity;
obtaining one or more neighbor features for neighbor entities of the candidate entity, where each neighbor entity of the candidate entity is an entity that is linked to the candidate entity;
obtaining one or more entity specific feature values for the candidate entity, where each entity specific feature value is determined independent of the neighbor entities of the candidate entity; and
determining a second quality score for the candidate entity using the first quality model, the second quality score being computed based on the first quality score, the neighbor features, and the entity specific feature values.

17. The system of claim 16, wherein the operations further comprise:
training a second quality model based on training features associated with the training entities, where the training features for each training entity include:
a given quality score for the training entity;
at least one neighbor quality score for at least one neighbor entity of the training entity; and
at least one entity specific feature value of the training entity;

wherein at least one neighbor entity of at least one training entity is a candidate entity, and wherein the second quality model provides, as output, a quality score for an entity.

18. The system of claim 16, wherein the first quality model was trained based on training features associated with the training entities, where the training features for each training entity include:
   a given quality score for the training entity;
   at least one neighbor quality score for at least one neighbor entity of the training entity; and
   at least one entity specific feature value of the training entity.

19. The system of claim 16, wherein the operations further comprise:
   identifying a link between a candidate entity and a neighbor entity, the link specifying that the neighbor entity includes a link that references the candidate entity.

20. The system of claim 16, wherein obtaining one or more neighbor features for neighbor entities of the candidate entity comprises obtaining an average neighbor quality score, the average neighbor quality score specifying an average of one or more quality scores that correspond to the one or more of the neighbor entities.

* * * * *